Nov. 12, 1963 J. W. BARTH 3,110,147
REEL TYPE LAWN MOWER WITH CATCHER
Filed June 12, 1961 2 Sheets-Sheet 1
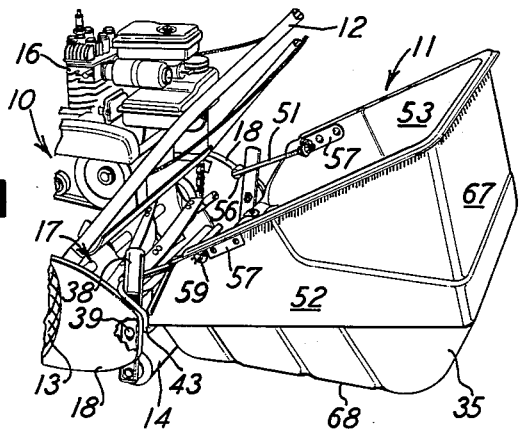
INVENTOR.
JOHN W. BARTH
BY:
Arthur J. Hansmann
ATTORNEY

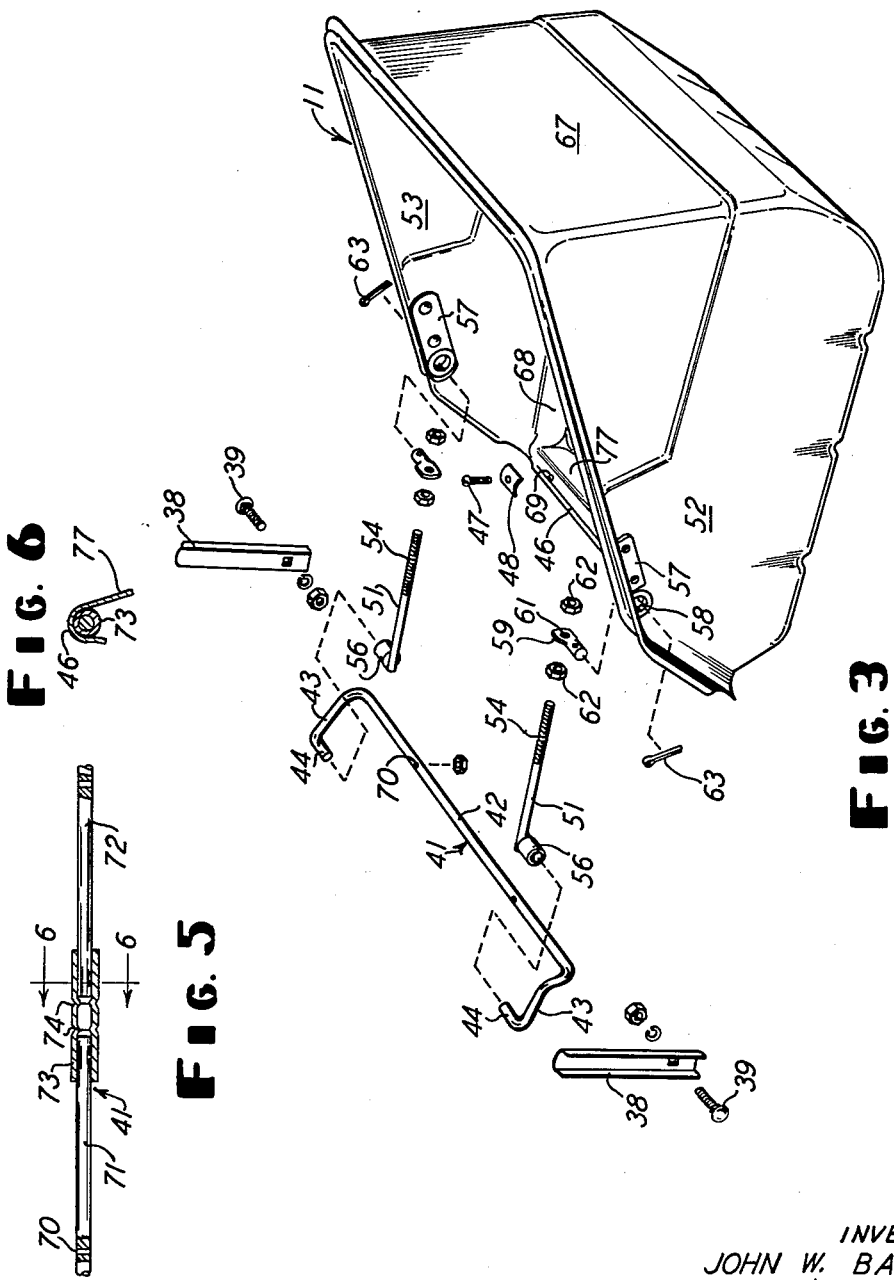

United States Patent Office 3,110,147
Patented Nov. 12, 1963

3,110,147
REEL TYPE LAWN MOWER WITH CATCHER
John W. Barth, Cudahy, Wis., assignor to Jacobsen Manufacturing Co., Racine, Wis., a corporation of Wisconsin
Filed June 12, 1961, Ser. No. 116,458
7 Claims. (Cl. 56—199)

This invention relates to a lawn mower, and more particularly it relates to a lawn mower of the reel type with a rear mounted grass catcher thereon.

It is a general object of this invention to provide the lawn mower and grass catcher in an arrangement whereby a maximum number of grass clippings can be stored and carried in the catcher. In accomplishing this particular object, the mower and the catcher cooperate in a manner that the clippings are placed into the catcher for the maximum capacity mentioned.

Another object of this invention is to provide a grass catcher which can be supported on the rear of a lawn mower in a manner that the weight of the catcher and the clippings therein are carried by the mower proper, rather than having them suspended from the handle so that the operator must lift the catcher with its clippings when the mower is in use.

Still another object of this invention is to provide a grass catcher for a reel type lawn mower wherein the catcher can be readily and easily mounted on the rear of the mower and wherein it has a provision for adjusting the angle of the catcher with respect to the horizontal plane of the mower proper. In accomplishing this particular object, the catcher can be utilized to a maximum capacity, and also the mower can be thus supported on the catcher and it will readily clear the ground as the mower moves thereover.

Still another object of this invention is to provide a rear mounted catcher for a reel type lawn mower wherein the catcher can be adjusted in its vertical position with one side being adjusted with respect to the other side so that for instance, the left side of the catcher with respect to the forward direction of movement, will be initially higher than the right side and thus when the clippings normally accumulate at a greater rate on the left side than on the right side, the catcher will become level as desired.

Still a further object is the provision of a reel type mower and catcher combination wherein the catcher is adjustable on the mower, and wherein the mower reel height is adjustable but the angular relation between mower and catcher remains unchanged after the mower reel height adjustment and therefore the catcher can be adjusted to its maximum-capacity position regardless of mower adjustment.

Other objects of this invention include the provision of a rear mounted catcher for a reel type lawn mower wherein the catcher can be readily and easily attached to and detached from the mower and yet has strength and lateral stability and also the catcher is not easily inadvertently detached from the mower by hitting a bump on the ground or the like.

Other objects and advantages will become apparent upon reading the following description in light of the accompanying drawings, wherein:

FIG. 1 is a left side perspective view of a catcher and a fragment of the reel type mower employed therewith.

FIG. 2 is a right side perspective of an enlarged fragment of that shown in FIG. 1 and having parts thereof removed and broken away.

FIG. 3 is an exploded and enlarged view of the catcher and the brackets of the mower for mounting the catcher thereon.

FIG. 4 is an enlarged sectional view taken on the lines 4—4 of FIG. 2.

FIG. 5 is a fragmentary view of a modification of a part of the catcher.

FIG. 6 is a sectional view taken on the line 6—6 of FIG. 5 and with a fragment of the catcher body added.

FIG. 1 shows the invention to include the reel type of lawn mower 10 and the grass catcher 11 mounted in a suspended or cantilever position on the rear of the mower 10, and it will be thus seen and understood that the catcher 11 is not supported on the mower handle 12, but rather the catcher is supported in a manner described later. Of course the mower 10 is generally of a conventional type which includes the usual ground wheels, such as the fragment of the shown wheel 13, and the usual rear ground-engaging roller 14, both for supporting the mower on the ground, and the usual engine 16, shown to be of the gasoline type, is employed for powering the mower in the well-known manner. Further, the usual spiral cutting reel 17 is included in the mower and it will here be noted that the reel 17 will rotate in a forward direction which is the same as the direction of rotation of the wheel 13 and it will also be noted that, in this instance, the reel 17 is shown to be spiralled in a direction so that the clippings will be thrown toward the left of the mower with respect to facing the forward direction of mower movement. This of course is common and fundamental in the operation of a reel type mower, and it is this type of spiral referred to hereinafter. Side plates 18 are included in the mower and constitute a part at least of the frame of the mower and of course support the parts heretofore mentioned.

Thus it will be understood that the engine 16 powers the mower and is employed for driving the wheels 13 and is also employed for rotating the reel 17. The reel blades 19 therefore rotate about the reel center rod 21 and the blades 19 cooperate with the bed knife or cutter bar 22 which presents the cutting edge 23 to the reel blades 19 so that the grass can be cut therebetween in the well-known manner. It will therefore again be seen that the blades 19 are spiralled in a direction such that upon forward rotation of the reel 17, the grass clippings will be thrown to the rear left with respect to the forward direction of movement of the mower. It has long been recognized that because of the excessive accumulation of grass clippings on the left side of a rear mounted catcher, the catcher soon becomes overloaded on the left side while the right side is not completely filled up to its capaicty. Also, it will be understood that the particular throwing of the grass clippings is dependent upon the speed of forward movement of the mower and also the speed of the rotation of the reel 17. Thus if the reel is slowly rotating and the mower is only slowly moving forward, then the clippings will fall to the front edge of the catcher 11, for instance. Also, if the mower is rapidly moving forward and the reel is rapidly rotating, then the clippings will be thrown further to the rear, but in both instances of speed, the clippings are of course thrown toward the left, as mentioned.

To meet the problem referred to, the invention herein consists of the provision of a deflector generally designated 24 and disposed immediately behind the reel 17 to engage the cut clippings and to increase the height of their trajectory. Thus it will be seen that the deflector 24 consists of a first portion 26 which extends at an angle of preferably approximately forty-five degrees and which angle is of course greater with respect to the horizontal than is the angle of the upper surface 27 of the cutter bar 22. Also, a rear portion 28 of the deflector 24 depends from the portion 26 and it extends between the bar 22 and a rod 29 which extends between the side plates 18 to form a part of the frame and mower. A clamp member 31 is thus disposed rearwardly of the portion 28 and a fastener or sheet metal screw 32 extends through the member 31 and into the portion 28 while the lower end 33 of the clamp 31 extends adjacent the tie rod 29 to secure the deflector 24 against upward displacement and off the cutter bar 22 beyond the position shown in the drawing.

It will thus be understood that the cutter bar or bed plate 22 is provided with the deflector 24 which presents a first upper surface 34 at a steep angle with respect to the horizontal or the frame of the mower and the bar 22 is also presented with the surface 27 which is at a less steep angle with respect to the horizontal so that the compound angle or angles are provided, and it will be further understood that the deflector 24 extends for approximately the left half of the entire length of the bar 22 and this of course is the half or end toward which the grass clippings are thrown due to the spiral of the reel blades 19. Thus the trajectory of the grass clippings is increased as they engage the deflector surface 34 and are therefore thrown at a higher angle so that they can be thrown further to the rear of the catcher 11 and the left rear corner indicated 35 in FIG. 1 is thus first filled and the clippings will of course fall off or gravitate from the initial pile of clippings in the catcher corner 35 and in this manner the entire catcher can be filled to its maximum capacity.

In order to fully utilize the action of the deflector 24, a rear-mounted catcher 11 is provided and disposed for retaining the clippings mentioned. Thus it will be noted that the side plates 18 each have a roller-supporting bracket 36 attached thereto by means of the bolts 37 and an upstanding bar or bracket 38 is also attached to the plates 18 by means of a bolt 39. The catcher 11 is then suspended over the bracket 38 by means of a carrier including the U-shaped rod 41 which includes the intermediate portion 42 and the two legs 43 having the inturned trunnions 44. The intermediate portion 42 extends below the catcher forward lip 46 and is attached thereto by means of the screws such as the shown screws 47 and an intervening plate 48 existing on each end of the rod portion 42 as indicated in FIG. 3. Two tie rods 51 are also part of the carrier and are disposed on opposite sides 52 and 53 of the catcher 11 and the rods include the threaded ends 54 and the sockets 56 on the opposite ends thereof. The sockets 56 of course receive the trunnions 44 as indicated by the broken lines in FIG. 3 and thus the connection between the trunnions and the sockets is pivotal for the adjustment mentioned hereinafter. It will be further noted that the catcher sides 52 and 53 are provided with reinforcing plates 57 which present additional sockets or openings 58 and which in turn receive the rotatable pins or members 59 as further indicated by the broken lines in FIG. 3. Of course the members 59 have openings 61 which receive the threaded ends 54 and adjusting nuts 62 are provided before and after the pins 59 on the threaded ends 54 so that the effective length of the tie rods 51 can be altered between the position of the trunnions 44 and the axis of the catcher sockets 58 and thus the angle of the catcher 11 is also variable as desired. To secure the pins 59 onto the catcher sides 52 and 53, cotter pins 63 are shown.

It will therefore be seen that the ends 43 of the support or rod 41 are shaped to conform to the rear edge 64 of each of the plates 18 and thus the rod legs or ends 43 abut the plate edges 64 while the tie rod sockets 56 engage the forward edges 66 of the brackets 38. In this manner the catcher 11 is supported in a cantilever position on the mower 10 and therefore the entire weight of the catcher and its contents are carried by the mower rather than by the operator through the handle 12 which is the normal manner of suspending the rear-mounted catchers on reel type lawn mowers. It will be further understood and noted that the tie rod sockets 56 are elongated to fully engage the bracket 38 so that lateral stability of the catcher 11 is provided and so that the pivotal action of the catcher with respect to the attitude of the mower is possible and yet the catcher remains stable in any angular position. Of course only simple adjustment of the nuts 62 on the tie rods 51 is required for selecting the angle of the catcher 11 with respect to the mower 10, and it will be noted that the two sides can be adjusted independent of each other and therefore the left side, for instance, could be disposed at a higher elevation than the right side 53 of the catcher so that when the catcher is filled more toward the side 52, the catcher will then assume a level position as desired.

The catcher 11 includes the sides 52 and 53 and the rear wall 67, and it will of course be understood that the bottom 68 extends between the three walls mentioned, and further the entire catcher is of a rigid material, such as rigid plastic or the like so that it can be suspended as described. Thus the catcher can be readily tipped slightly forward and lifted off the standards or brackets 38 and removed from the mower 10 for emptying or the like, and also the catcher can bounce by hitting a bump at the heel or rear end thereof without having it slip off the mower. It will also be understood that when the roller 14 is adjusted vertically in the usual manner through the adjustment of the supporting brackets 36, the angle of the mower 10 will then be altered but the relative angle of the catcher to the mower remains the same until it is desired that the angle of the catcher 11 be altered also and in this instance, the catcher will be altered by adjustment of the carrier rods 51 as described.

Here it should also be noted that the member 41 remains set with respect to the mower, and thus the catcher is adjusted with respect to member 41 also. To do this, holes, such as shown hole 69, which align with bolts 47 and holes 70 in member 41, are oversize with respect to bolts 47 so that when the bolts 47 are loosened, the catcher adjustment can be made as the bolts 47 move transversely in the holes 69. This structure also insures that the catcher front lip 46 remains relative to the mower and is not moved except of course to rotate slightly about member 41, and thus the catcher can be set down at the rear for full capacity as the lip 46 remains high with the member 41, and the catcher upturned front end or wall 77 remains at its elevation with respect to the mover since it is attached to the member 41.

Further, the member 41 is modified in FIGS. 5 and 6 to show two pieces 71 and 72 which are relatively rotatable in the sleeve 73. The latter is provided with annular grooves 74 for end abutment of each of the pieces 71 and 72, and the bolts 47 in the holes 70 hold the assembly together. Thus, the catcher opposite sides 52 and 53 can be further adjusted in elevation with respect to each other.

FIG. 4 then also shows that the center of the reel 19 is indicated at C and the blades 17 therefore scribe the circular path indicated by the dotted line B and with the relation described, a line drawn from the center C to the deflector 24, is drawn at a 45 degree plane with respect to the ground level, will form the obtuse angle indicated A and this angle is of course between the 45 degree line described and the cutting edge 23 of the bed knife 22. Thus the bed knife 22 is provided with two upper or top surfaces 27 and 34 which are at relative angles to each other for the purpose mentioned.

While a specific embodiment of this invention has been shown and described, it will be understood that certain changes could be made therein and the invention therefore should be limited only by the scope of the appended claims.

What is claimed is:

1. A grass catcher for mounting on the rear of a reel type lawn mower including two upright brackets and with abutment surfaces disposed below the level of at least the upper ends of said brackets, comprising side walls and a rear wall and a bottom with a front lip and all being of a rigid material, a U-shaped support member having the intermediate portion thereof extending below and being attached to said front lip, the legs of said U-shaped support member extending forwardly of said catcher in alignment with said side walls thereof, and an adjustable tie rod rotatably attached at one end to the forward ends of each of said legs and attached at the other end to each of said side walls and with the intermediate portion of said tie rod being spaced from said U-shaped support member for attaching therewith to said brackets and for said U-shaped support member to extend into abutment with said abutment surfaces for adjustable cantilever suspension of said catcher on said mower.

2. In a reel type lawn mower including a cutting reel and a bed plate, a pair of brackets fixedly attached to said mower and disposed spaced apart at the rear of said mower which also includes a surface disposed below the level of each of said brackets and adjacent thereto, a grass catcher including rigid upright side walls which are self-supporting, a carrier attached to each of said side walls in a first portion of said carrier and being removably attached to said brackets and with said carrier including a second portion connected to said catcher and disposed in abutting relation with each of said surfaces, said carrier being rigid throughout and between said portions to suspend said catcher on said mower in a cantilever manner.

3. In a reel type lawn mower including a cutting reel and a bed plate, a pair of brackets fixedly attached to said mower and disposed spaced apart at the rear of said mower which also includes spaced-apart surfaces disposed below the level of each of said brackets and adjacent thereto, a grass catcher, and a rigid carrier included in said catcher and being adjustably connected thereto to be variable in length and being attached to the top portion of said catcher and supporting the remainder of said catcher in a depending manner and with said carrier being removably attached to said brackets and with said catcher including spaced-apart portions in abutting relation with said surfaces to suspend said catcher on said mower in a cantilever manner in selected angular positions determined by the adjustment of said carrier.

4. A grass catcher for mounting on the rear of a reel type lawn mower including two upright brackets and with abutment surfaces disposed below the level of at least the upper ends of said brackets, comprising side walls and a rear wall and a bottom with a front lip and all being of a rigid material, a carrier extending below and being attached to said front lip and extending upwardly and forwardly of said catcher to be spaced therefrom in positions aligned with said side walls, said carrier including a tie rod attached at one end to each of said side walls and being attached to the forwardly spaced portions of the remainder of said carrier for attaching to said brackets, said tie rods being adjustable in length for selective positioning of said catcher on said mower.

5. A grass catcher for mounting on the rear of a reel type lawn mower including two upright brackets and with abutment surfaces disposed below the level of at least the upper ends of said brackets, comprising upright side walls and a rear wall rigidly connected around the upper ends thereof, two members attached to said upper ends at spaced-apart locations thereon, a tie rod engaged with each of said members and being threaded at the ends thereof for adjustment in the engagement with said members and extending forwardly of said side walls, the other ends of said tie rods being angularly disposed for hooking onto said brackets, and a support member attached to said tie rods at said other ends thereof and being connected to said catcher and disposed forwardly thereof and in the upright plane of said side walls for abutment with said abutment surfaces to cantilever suspend said catcher on said mower.

6. A grass catcher for mounting on the rear of a reel type lawn mower including two upright brackets and with abutment surfaces disposed below the level of at least the upper ends of said brackets and being included in said frame, comprising side walls and a rear wall and a bottom and a front lip and all being of a rigid material to be self-supporting, a support member extending below and being adjustably attached to said front lip to be attached thereto in various selected positions and being connectable to said brackets and disposed to extend in abutment with said abutment surfaces when connected to said brackets, and a tie rod attached at one end to each of said side walls and being attached to opposite ends of said support member for connecting therewith to said brackets and said tie rods being adjustable in the attachment to said side walls for disposing said catcher in selected positions.

7. In a reel type lawn mower including a cutting reel and a bed plate, a pair of brackets fixedly attached to the rear of said mower which also includes a surface disposed below the level of each of said brackets and adjacent thereto, a grass catcher including upright side walls and a bottom, an adjustable carrier member attached to each of said side walls to be separately adjustable in the attachment with each of said side walls and being removably attached to said brackets and with said catcher including a support member with spaced-apart portions in abutting relation with said surfaces to suspend said catcher on said mower in a cantilever manner, said support member being in two portions across the width of said mower for rotating one portion relative to the other and with said two portions being separately attachable to the forward edge of said bottom and thereby facilitating raising one of said side walls higher than the other.

References Cited in the file of this patent

UNITED STATES PATENTS

| | | |
|---|---|---|
| 493,612 | Braun | Mar. 14, 1893 |
| 680,467 | Shoemaker | Aug. 13, 1901 |
| 2,568,045 | Weisert | Sept. 18, 1951 |
| 2,796,718 | Hadler | June 25, 1957 |
| 2,848,862 | Harrigan | Aug. 26, 1958 |
| 2,970,421 | Krewson | Feb. 7, 1961 |
| 2,983,095 | Barth | May 9, 1961 |

FOREIGN PATENTS

| | | |
|---|---|---|
| 617,679 | Great Britain | Feb. 9, 1949 |